April 5, 1927.

W. J. ROULEAU

COMPUTING SCALE

Filed May 4, 1925

Inventor.
Wilfred J. Rouleau
by Heard Smith & Tennant.
Attys.

April 5, 1927.
W. J. ROULEAU
COMPUTING SCALE
Filed May 4, 1925   3 Sheets-Sheet 3
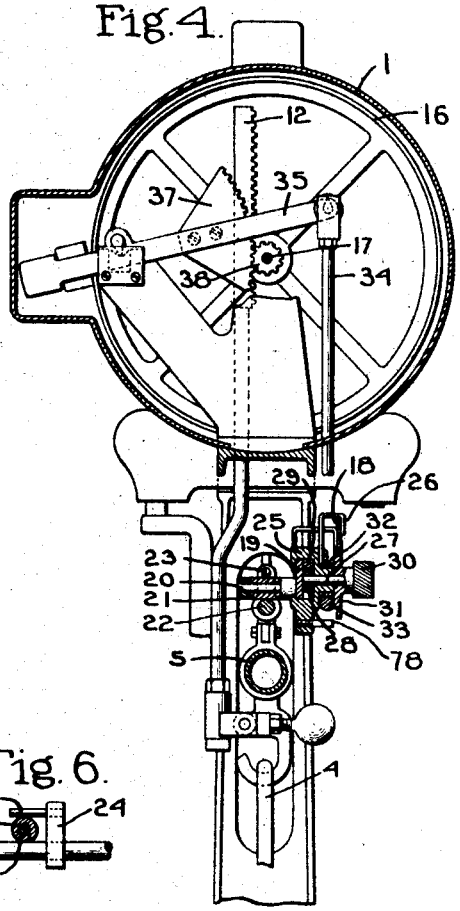
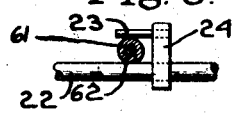
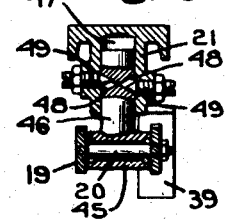
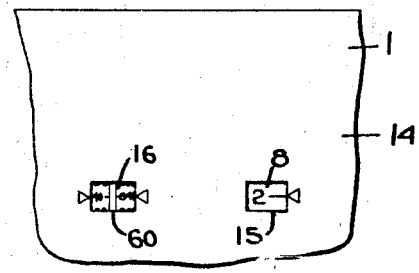
Inventor.
Wilfred J. Rouleau
by Heard Smith & Tennant.
Attys Patented Apr. 5, 1927.

1,623,134

UNITED STATES PATENT OFFICE.

WILFRED J. ROULEAU, OF QUINCY, MASSACHUSETTS.

COMPUTING SCALE.

Application filed May 4, 1925. Serial No. 27,935.

This invention relates to computing scales and particularly to that type of computing scale in which two separate dials are employed, one for indicating the weight and the other for indicating the price.

An object of the invention is to provide a computing scale of this type which is accurate in operation, which is relatively simple in construction and which has other advantages, all as will be more fully hereinafter set forth.

In order to give an understanding of the invention I have illustrated in the drawings a selected embodiment thereof which will now be described after which the novel features will be pointed out in the appended claims.

Fig. 4 is a section on the line 4—4, Fig. 2;

Fig. 5 is an enlarged section on the line 5—5, Fig. 2;

Fig. 6 is a detail showing the retaining finger;

Fig. 7 is a fragmentary view illustrating the sight openings through which the dials are read.

Figure 1:
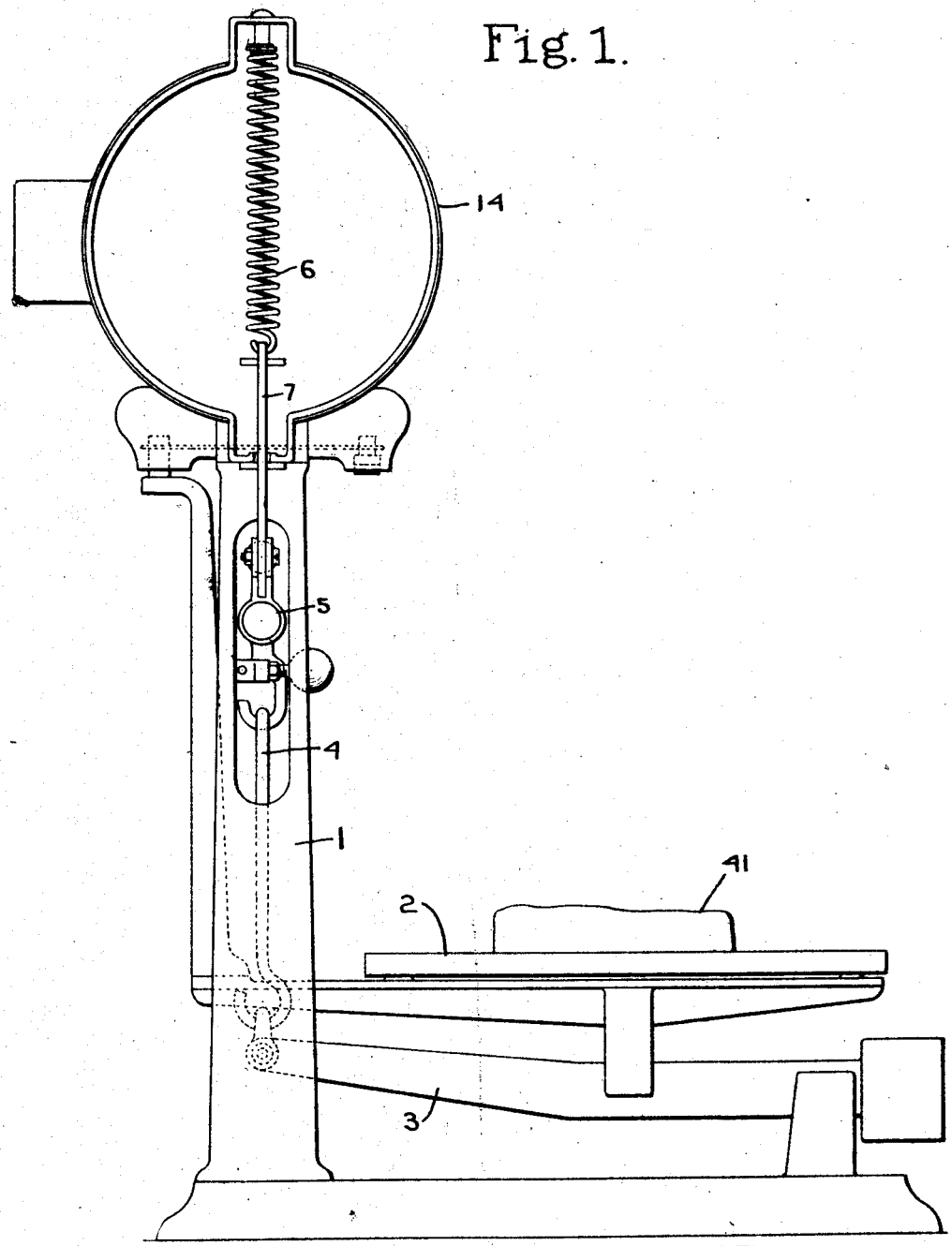
Fig. 1 is a side view of a scale embodying my invention.

The operative parts of the device are supported on a suitable frame 1 which may have any appropriate construction. The platform on which the articles to be weighed are placed is indicated at 2 and this supported by a suitable system of levers 3 which are connected by a link 4 to a cross beam 5. This cross beam 5 is connected to two tension springs 6 by means of straps or connections 7. When, therefore, a weight is applied to the platform 2 the cross bar 5 will be moved downwardly in opposition to the action of the springs 6 as usual in spring scales of this type.

The weight-indicating dial is shown as a wheel 8 which is graduated on its periphery to indicate pounds or any other unit of weight and which is mounted on a shaft 9 that is journalled in suitable bearings 10. This shaft has a pinion 11 fast thereon with which meshes a rack 12, the latter being connected by a rod 13 to the cross bar 5. Any downward movement of the cross bar 5 due to a weight on the platform 2 will, therefore, rotate the weight-indicating dial 8. This dial 8 is located within a housing 14 which has a slight opening 15 therein through which the dial may be read.

The parts thus far described are or may be all as usual in spring scales and form no part of my present invention.

The computing scale embodying my invention is of that type in which a single price-indicating dial separate from the weight-indicating dial is employed and by which the total price to be paid for the article being weighed will be indicated. This price-indicating dial is shown at 16 and it is mounted on a shaft 17 which is journalled in bearings 10.

This price-indicating dial is so connected to the weighing mechanism by adjustable means which includes a price-per-pound adjustment that when said price-per-pound adjustment is set to indicate any desired price per pound then whenever an article is placed on the platform 2 the price-indicating dial will be turned to indicate the total price of the article based on the price per pound as indicated by the price-per-pound adjustment. The price-per-pound adjustment comprises a scale 18 graduated to indicate prices per pound or other unit of weight which is supported on a swinging arm 19 that is pivoted at 20 to a fixed support 21. This arm is also connected to the vertically moving frame which includes the cross bar 5 so that the arm 19 will rise and fall as the frame moves up or down. The position of the arm 19, therefore, will always be governed by the weight which is on the platform 2.

For thus connecting the arm 19 and the frame 5, 7 said arm is provided with a lateral stud 61 carrying a roll 62 which rests on a bar 22 that extends between the members 7 and is parallel to the bar 5. The roll 62 is maintained in engagement with the bar 22 by means of a retaining finger 23 which extends laterally from a block 24 that is secured to the bar 22. As the bars 5 and 22 are depressed by the placing of a weight on the platform 2 the arm 19 will thus be swung downwardly about its pivot into an angular position which corresponds to the amount of depression of the bars 5 and 22.

Slidably mounted on the arm 19 is a carriage 25 carrying a pointer 26 which cooperates with the scale 18. This carriage can be moved back and forth on the bar to bring the pointer 26 to any of the indication marks on the scale thereby to indicate the price per pound of the article being weighed. Journalled in the carriage is a shaft 27 on which is secured a pinion 28 that meshes with a rack 29 formed on the arm 19. The shaft 27 is also provided with a thumb piece 30 by which it may be turned and it is further provided with a dial 31 which is graduated in fractions of the price unit indicated on the scale 18. If the scale 18 is graduated in U. S. currency it will be graduated so that each division of the scale will represent 10¢ and the dial 31 may then be divided into ten graduations each of which represents 1¢. The pinion 28 is preferably of such a size that one rotation of the shaft 27 will advance the indicator 26 from one graduation on the scale 18 to the next graduation.

The carriage is provided with a roller 32 which rests on a horizontal bar 33 which is connected at its ends by links 34 to the arms of a U-shaped frame 35 that is pivoted in knife edge bearings 36. One arm of this frame 35 is provided with a segmental gear 37 which meshes with a pinion 38 fast on the shaft 17 of the price-indicating dial.

The arm 19 is provided with the adjustable counterweight 39 which is intended to counterweight the weight of the arm and the frame 35 is also provided with the adjustable counterweight 40 which may be adjusted to balance the weight of the carriage 25.

The operation of the device is as follows. When there is no weight on the platform 2 and the parts are in their normal position the arm 19 will be exactly parallel with the bars 22 and 5 and both dials will indicate zero. When a weight or bundle 41 is placed on the platform 2 the frame comprising the bars 5 and 22 will of course, be depressed to a point corresponding to the weight 41 and this weight will be indicated on the dial 8. In order to get the total cost of the article 41 the operator will adjust the slide 25 to a point to indicate the price per pound for said article.

Figures 2, 3:
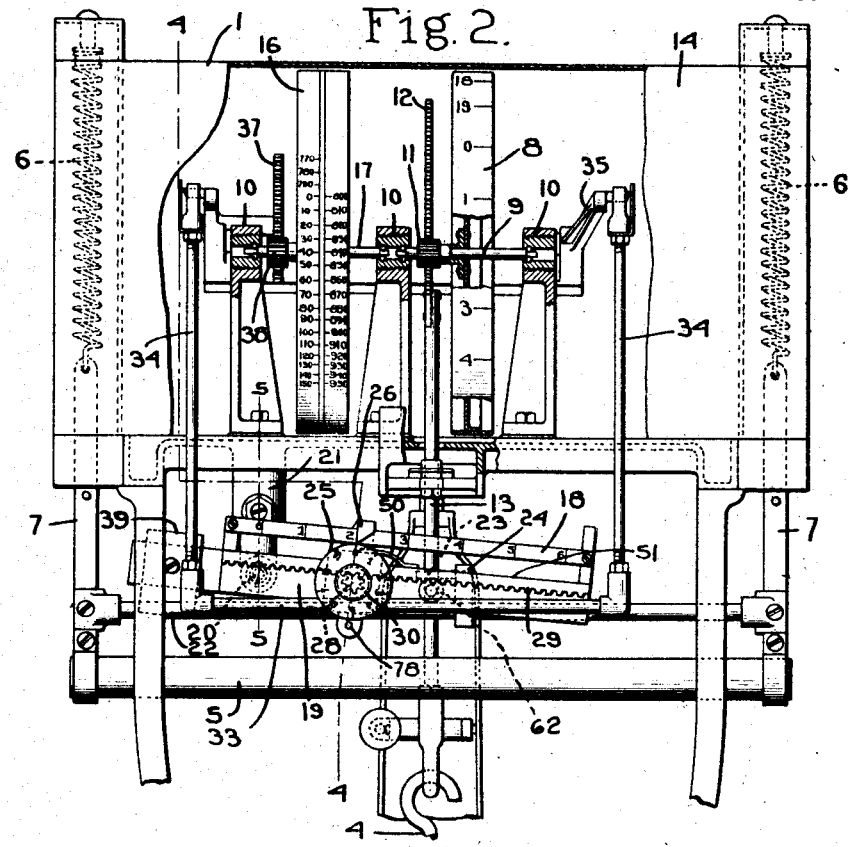
Fig. 2 is a front view partly broken out illustrating the weight dial and the price dial.
Fig. 3 is a top plan view of Fig. 2 with a part of the housing broken out.

Assuming that the article 41 is to sell for 20¢ a pound then the slide 25 will be adjusted as shown in Fig. 2 to indicate 20. The downward movement of the bar 22 due to the weight 41 will result in swinging the arm 19 downward as indicated in Fig. 2 so that said arm will assume an inclined position.

Since the carriage 25 has a bearing on the cross bar 33 through the roll 32 said cross bar will be depressed by the downward swinging movement of the arm 19 and this downward movement of the cross bar 33 will operate through the connections 34 to swing the frame 35 and thereby turn the price-indicating dial 16. The extent of the downward movement of the cross bar 33 will depend upon the position of the slide on the arm 19. If the slide is adjusted to the right hand end of the arm 19 the cross bar 33 will have a greater downward movement for a given weight placed on the platform 2 than if the slide is in the position shown in Fig. 2 or is at the left of said position and the parts are so designed and the dial 16 is so graduated that it will always indicate an amount equal to the price per pound as indicated by the position of the slide 25 multiplied by the number of pounds as indicated by the dial 8. When the slide 25 is adjusted to indicate zero it will be directly in line with the axis or pivot of the arm 19 and, therefore, the swinging movement of the arm 19 will produce no vertical movement of the bar 33 and the price-indicating dial 16 will remain at zero.

In order that the device may function properly it is necessary that the price-indicating arm 19 should be exactly parallel to the bars 22 and 5 when there is no weight on the scale and the dials indicate zero. In order to secure this absolute parallelism I have made the pivotal connection between the arm 19 and the bracket 21 an adjustable one so that said pivoted end of the arm can be adjusted vertically. This pivotal connection comprises a pivot pin 20 which is journalled in a head 45 having a stem 46 that is received in a recess 47 formed in the bracket 21. The stem is provided with two cone-shaped recesses 48 and the bracket 21 is provided with two pointed screws 49, the points of which enter the recesses. These screws are offset from each other as shown in Fig. 5 so that by backing off one screw and advancing the other the stem 46 will be adjusted vertically.

78 indicates a stop pin which is carried by the slide 25 and is situated beneath the bar 33. This stop pin is for the purpose of retaining the slide and the bar 33 in proper operative relation.

50 indicates a resilient friction device carried by the slide and frictionally engaging the surface 51 of the arm 19. This friction device is for the purpose of retaining the slide in any adjusted position. In order to provide a scale having a large range without unduly increasing the size I have arranged the price-indicating dial and the mechanism for operating it so that said dial can make more than one forward rotation continuously in the same direction and have placed on the dial two parallel rows of price-indicating graduations. One of these rows has graduations from zero up to a predetermined figure and the other row contains price indications from said predetermined number to another predetermined number. Merely for the sake of illustration the drawings show the first row as running from 0 to 800 and the second row from 800 on. If, therefore an article has been weighed, the price of which will be under $8.00, the price-indicating dial 16 would be rotated less than one rotation. On the other hand, if the price of the article being weighed was over $8.00 then when the article is placed on the scales the dial 16 will rotate through one complete revolution and will then continue to rotate forwardly until the proper price mark is brought into reading position. In this way the scale may have a large range without increasing unduly the size of the drum or dial 16.

While I have illustrated herein a selected embodiment of my invention I do not wish to be limited to the constructional features shown.

I claim:

1. In a computing scale, the combination with a weighing scale including a vertically moving part, in the form of a horizontal rod, of a pivoted price-indicating arm having a stud engaging said rod so that the position of the arm at all times corresponds to the weighing movement of the scale, and a price-indicating dial controlled by said arm.

2. In a computing scale, the combination with a weighing scale including a vertically moving part in the form of a horizontal rod, of a pivoted price-indicating arm having a stud engaging said rod so that the position of the arm at all times corresponds to the weighing movement of the scale, a slide carried by said arm to indicate the price per pound and a price-indicating dial operated by said arm and controlled as to the extent of its movement by the position of the slide.

3. A computing scale such as set forth in claim 2 in which the arm is provided with a scale graduated in price units and the slide carries a dial which rotates as the slide moves and is graduated in fractions of said price unit.

4. A computing scale as set forth in claim 3, in combination with an indicator on the slide which co-operates both with the scale on the arm and the graduations on the dial.

5. In a computing scale, the combination with a weighing scale including a vertically moving part, a pivoted price-indicating arm connected to the scale so that the position of the arm at all times corresponds to the weighing movement of the scale, a rack carried by said arm, a price-indicating scale on the arm, a slide mounted on the arm, said slide having an indicator co-operating with the scale, a shaft journalled in the slide and a pinion thereon meshing with said rack, whereby the slide is adjusted on the arm by rotating the shaft, and a price-indicating dial actuated by the slide.

6. In a computing scale, the combination with a weighing scale including a vertically moving part, a pivoted price-indicating arm connected to the scale so that the position of the arm at all times corresponds to the weighing movement of the scale, a rack carried by said arm, a price-indicating scale on the arm, a slide mounted on the arm, said slide having an indicator co-operating with the scale, a shaft journalled in the slide and a pinion thereon meshing with said rack, whereby the slide is adjusted on the arm by rotating the shaft, a price-indicating dial actuated by the slide, and a friction device for retaining the slide in adjusted position.

7. In a computing scale, the combination with a weighing scale including a vertically moving horizontal bar, a pivoted price-indicating arm having a projection engaging said bar whereby the position of the arm is determined by that of the bar, a price-indicating slide mounted on said arm, and a price-indicating dial actuated by the slide.

8. In a computing scale, the combination with a weighing scale including a vertically movable part, of a pivoted price-indicating arm connected to said scale so that the arm at all times assumes a position corresponding to the weighing movement of the scale, a price-indicating slide mounted on said arm, said slide having a roll, a horizontal bar engaging said roll, a price-indicating dial and connections between said bar and dial.

9. In a computing scale, the combination with a weighing scale including a vertically movable horizontal bar, of a pivoted price-indicating arm connected to said scale so that the arm at all times takes a position corresponding to the weighing movement of the scale, means for adjusting the pivot of the arm, whereby it may be brought into exact parallelism with the bar when the scale indicates zero, and a price-indicating dial controlled by said arm.

10. In a computing scale, the combination with a weighing scale including a vertically movable horizontal bar, of a pivoted price-indicating arm connected to said scale so that the arm at all times takes a position corresponding to the weighing movement of the scale, means for adjusting the pivot of the arm, whereby it may be brought into exact parallelism with the bar when the scale indicates zero, a price-indicating slide adjustable on said arm and a price-indicating dial controlled as to its position by said slide.

11. In a computing scale, the combination with a weighing scale including a vertically movable horizontal bar, of a pivoted counterbalanced price-indicating arm connected to said scale so that the arm at all times takes a position corresponding to the weighing movement of the scale, means for adjusting the pivot of the arm, whereby it may be brought into exact parallelism with the bar when the scale indicates zero, and a price-indicating dial controlled by said arm.

12. In a computing scale, the combination with a weighing scale including a vertically moving member in the form of a horizontal rod, a pivoted price-indicating arm having a stud engaging said rod whereby the position of the arm at all times corresponds to the weighing movement of the scale, a price-indicating slide adjustable on said arm, a rocking frame controlled as to its position by said slide, and a price-indicating scale actuated by said rocking frame.

13. In a computing scale, the combination with a weighing scale including a vertically moving member, a pivoted price-indicating arm connected to said scale, a price-indicating slide adjustable on said arm, a counterbalanced rocking frame controlled as to its position by said slide, and a price-indicating scale actuated by said rocking frame.

14. In a computing scale, the combination with a weighing scale, of a cylindrical computing dial capable of rotating continuously in the same direction for more than one revolution, means to actuate the same from the weighing scale to indicate the total price of the article weighed by continuous rotation in one direction, said computing dial having two parallel rows of price-indicating graduations each row extending entirely around the cylindrical dial, one row containing price indications from zero to a predetermined figure and the other row containing price indications from said predetermined figure to another predetermined figure.

15. In a computing scale, the combination with a weighing scale including a vertically-moving member, a pivoted price-indicating arm controlled as to its position by said member, a price-indicating slide adjustable on said arm, a rocking frame controlled as to its position by said slide, and a price-indicating scale actuated by said rocking frame, said frame being provided with means for counterbalancing the weight of the slide.

16. In a computing scale, the combination with a weighing scale including a vertically-movable horizontal bar, of a pivoted price-indicating arm connected to said scale so that the arm at all times takes a position corresponding to the weighing movement of the scale, a price-indicating slide adjustable longitudinally of the arm, a rocking frame having a horizontal bar with which the slide engages, a stop pin carried by said slide for maintaining operative engagement between the latter and the bar, and a price-indicating dial actuated by said rocking frame.

17. In a computing scale, the combination with a weighing scale comprising a vertically-moving horizontal bar, of a pivoted price-indicating arm having a projection resting on said bar, a retaining pin carried by said bar for engaging said projection and maintaining it in operative engagement with the bar, a price-indicating slide adjustable longitudinally of the arm, and a price-indicating dial controlled as to its movement by the combined position of the slide and the arm.

In testimony whereof, I have signed my name to this specification.

WILFRED J. ROULEAU.